United States Patent [19]
Coelln

[11] Patent Number: 5,464,086
[45] Date of Patent: Nov. 7, 1995

[54] BALL TRANSFER UNIT

[75] Inventor: Axel Coelln, Stamford, Conn.

[73] Assignee: Transact International Inc., Darien, Conn.

[21] Appl. No.: 205,832

[22] Filed: Mar. 3, 1994

[51] Int. Cl.⁶ .................................................. B65G 13/00
[52] U.S. Cl. .......................... 193/35 SS; 193/35 MD; 193/35 B
[58] Field of Search .................... 193/35 SS, 35 MD, 193/35 B; 384/49, 490, 491, 495, 610; 16/24–26

[56] References Cited

U.S. PATENT DOCUMENTS

| | | | |
|---|---|---|---|
| 903,850 | 11/1908 | Fenney. | |
| 1,033,264 | 7/1912 | Oppy. | |
| 1,432,760 | 10/1922 | Kirschke. | |
| 3,132,904 | 5/1964 | Wakamatsu | 308/26 |
| 3,920,290 | 11/1975 | Evarts | 308/6 |
| 4,871,052 | 10/1989 | Huber | 193/35 MD |
| 5,147,032 | 9/1992 | Rombouts | 193/35 MD |
| 5,160,017 | 11/1992 | Goodman et al. | 193/35 MD |

FOREIGN PATENT DOCUMENTS 510684  10/1953  Belgium.

*Primary Examiner*—Joseph E. Valenza
*Attorney, Agent, or Firm*—St. Onge Steward Johnson & Reens

[57] ABSTRACT

A ball deck is disclosed capable of conveying a container having an uneven bottom surface. The ball deck, having an upper surface, houses a plurality of ball transfer units. Each ball transfer unit has a first housing having an upper end terminating adjacent the upper surface of the ball deck. A first load supporting ball, which is preferably hollow, is disposed in an upper section of the housing and has a portion extending above the upper surface of the ball deck. A second load supporting ball, having a lesser diameter than the first ball, supports the first ball. A spring biases the balls axially upward by allowing the first ball to move between an upward position and a downward position when supporting an irregular load surface.

16 Claims, 3 Drawing Sheets

BALL TRANSFER UNIT

FIELD OF THE INVENTION

The present invention relates to a transfer system for conveying containers such as pallets and the like, and more particularly, to a component of such a system sometimes known as a ball transfer unit.

BACKGROUND OF THE INVENTION

Ball transfer units (BTUs) are known for facilitating movement of pallets or cargo containers from one location to another. Generally, each ball transfer unit has a ball or roller, which projects above a "ball deck" and which is capable of freely rolling. The ball contacts a portion of the bottom surface of the container being conveyed along the deck. The pallet or container is conveyed by a person walking along the ball deck and pushing the pallet or container. The pallet or container is moveable along the ball deck by the reduced friction provided by the BTUs in the ball deck.

Prior art BTUs, when used with aluminum air cargo containers, have several operating disadvantages. The prior art BTUs are unable to readily accommodate uneven bottom surfaces of air cargo containers, and have been susceptible to contamination with dirt and other materials, causing increased friction and decreased performance.

Another disadvantage of known BTUs is that the balls have relatively small diameters. Consequently, the balls present relatively small contact areas to support a pallet or container, creating very high loads on the areas of the pallet or container supported by the BTU. This excessive contact stress can damage the containers, which are typically light-weight aluminum, and hence are somewhat fragile. This excessive contact stress requires the pallets or containers to have structural strength in excess of that otherwise necessary to support the loads carried therein, and also requires that there be a substantial number of such BTUs to spread the contact stress over a larger area.

A ball transfer unit, as used in a different field of art, i.e., conveying slabs of hot milled steel, is disclosed in Belgium Pat. No. 510,684. The BTU disclosed in the Belgium patent has two roller balls of the same diameter. The unit is useful primarily with slabs or other materials having a uniform bottom surface. The ball transfer unit is unable to accommodate uneven bottom surfaces of containers or pallets, for example, aluminum air cargo containers, which typically have uneven bottom surfaces to enhance their structural integrity. Furthermore, the design is susceptible to contamination of the ball bearings with dirt and other contaminants, which may enter through the top of the housing. Thus the contaminants are capable of interfering with the operation of the ball bearings, sometimes resulting in BTU failure.

What is desired, therefore, is a ball transfer unit which minimizes the force necessary to move a container, which is capable of accommodating uneven bottom surfaces of the container, which reduces the ability of dirt and other contaminates to interfere with the operation of the unit. Further, such a desirable ball transfer unit should permit the use of lighter weight cargo containers, which is of critical importance when the container is used in connection with air cargo, where every saved ounce of weight will save the airline the cost of the fuel needed to lift that weight.

SUMMARY OF THE INVENTION

Accordingly, it is an object of the present invention to provide a ball transfer unit that minimizes frictional drag in order to enhance movement of the container.

It is another object of the invention to provide a ball transfer unit which is capable of moving vertically within a ball field to accommodate uneven bottom surfaces of a container.

It is yet another object of the present invention to provide a ball transfer unit which more effectively reduces the ability of contaminants to interfere with the operation of the unit.

It is a further object to provide a ball transfer unit which reduces the amount of contact stress on a container, allowing for the use of a container which is more light-weight than conventional containers.

To overcome the deficiencies of the prior art and to achieve the objects listed above, a ball deck is disclosed, having an upper surface, and having a plurality of ball transfer units disposed within the ball deck for conveying containers. Each of the ball transfer units includes: a first housing having an upper end terminating adjacent the upper surface of the ball deck; a first load supporting ball contained in the first housing and projecting above the upper surface of the ball deck for conveying a container; a second load supporting ball having a lesser diameter than the first ball, for supporting the first ball; and a spring for biasing the first and the second balls upward toward the bottom surface of the container.

The first load supporting ball, which is preferably hollow, is disposed in an upper section of the first housing and has a portion extending above the upper surface of the ball deck. A substantially frictionless means is provided inside the upper section of the housing. The frictionless means has an inner diameter bore for retaining the first ball and for limiting lateral movement of the first ball, and in one preferred embodiment, had bearings to enhance frictionless rotation of the first load supporting ball. A retaining member retains the first ball in the sleeve inside the housing and prevents the first ball from escaping in the upward direction.

The second load supporting ball is disposed inside a second housing, the second housing being disposed inside the first housing. The second ball is supported by a plurality of freely rotating ball bearings housed within a ball bearing cup disposed within the second housing.

The spring, adjacent to the second housing and disposed inside the first housing, biases the second housing axially upward, which in turn, biases the first and second balls axially upward. As such, the first and second ball and the second housing are moveable between an upward position and a downward position.

The first ball is larger than the second ball to shield the second ball from contaminants, and a gutter is provided around the second ball to collect contaminants. Preferably, the first ball has a diameter which is between about 1.8 and about 4 times the diameter of the second ball. Most preferably, the first ball has a diameter which is about 63.5 millimeters and the second ball has a diameter of about 30 millimeters.

The invention and its particular features and advantages will become more apparent from the following detailed description when considered with reference to the accompanying drawings.

DETAILED DESCRIPTION OF THE DRAWINGS

Figure 1:
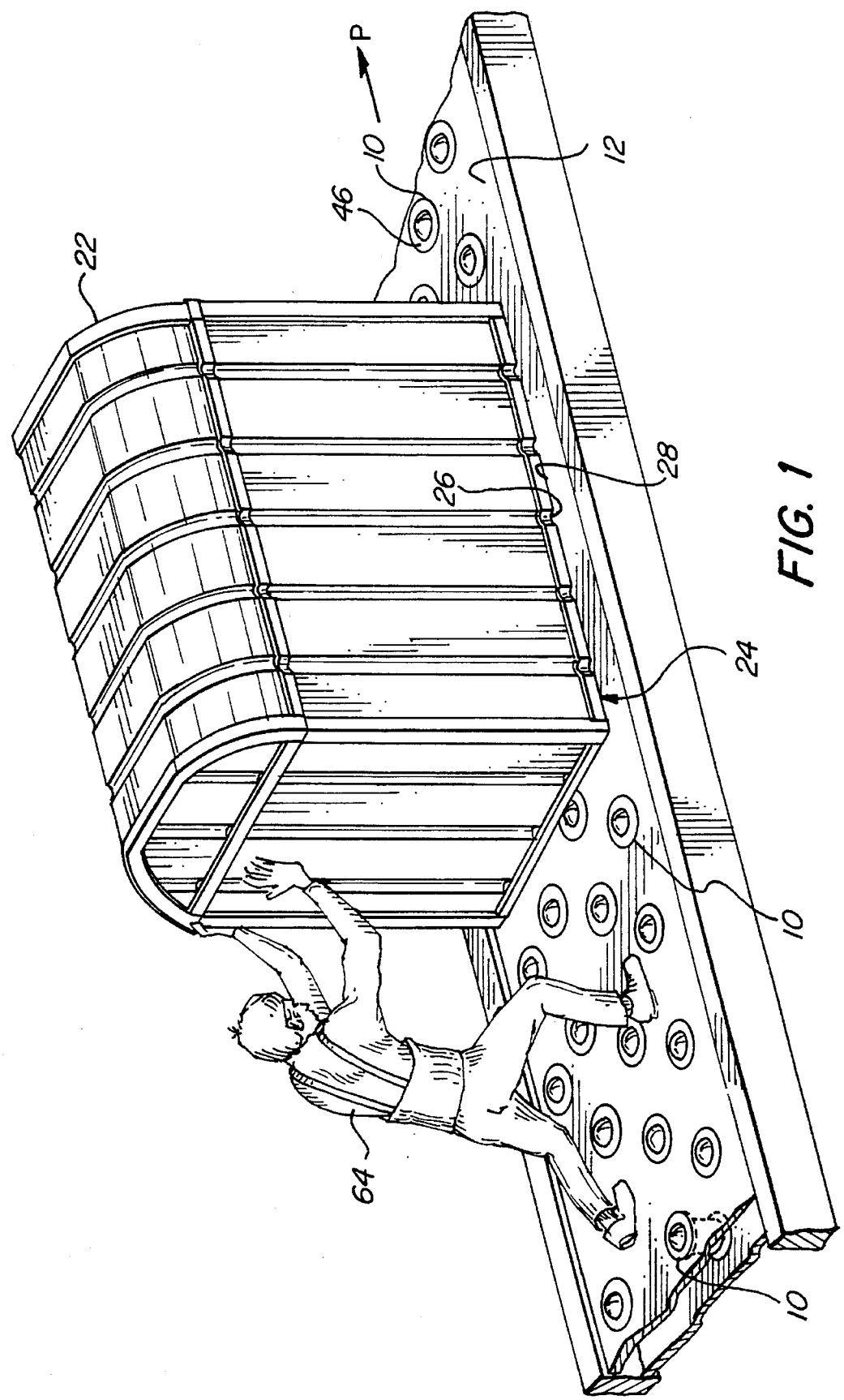
FIG. 1 is an isometric view of a portion of a ball deck having a plurality of ball transfer units, constructed in accordance with the present invention.
Figure 2:
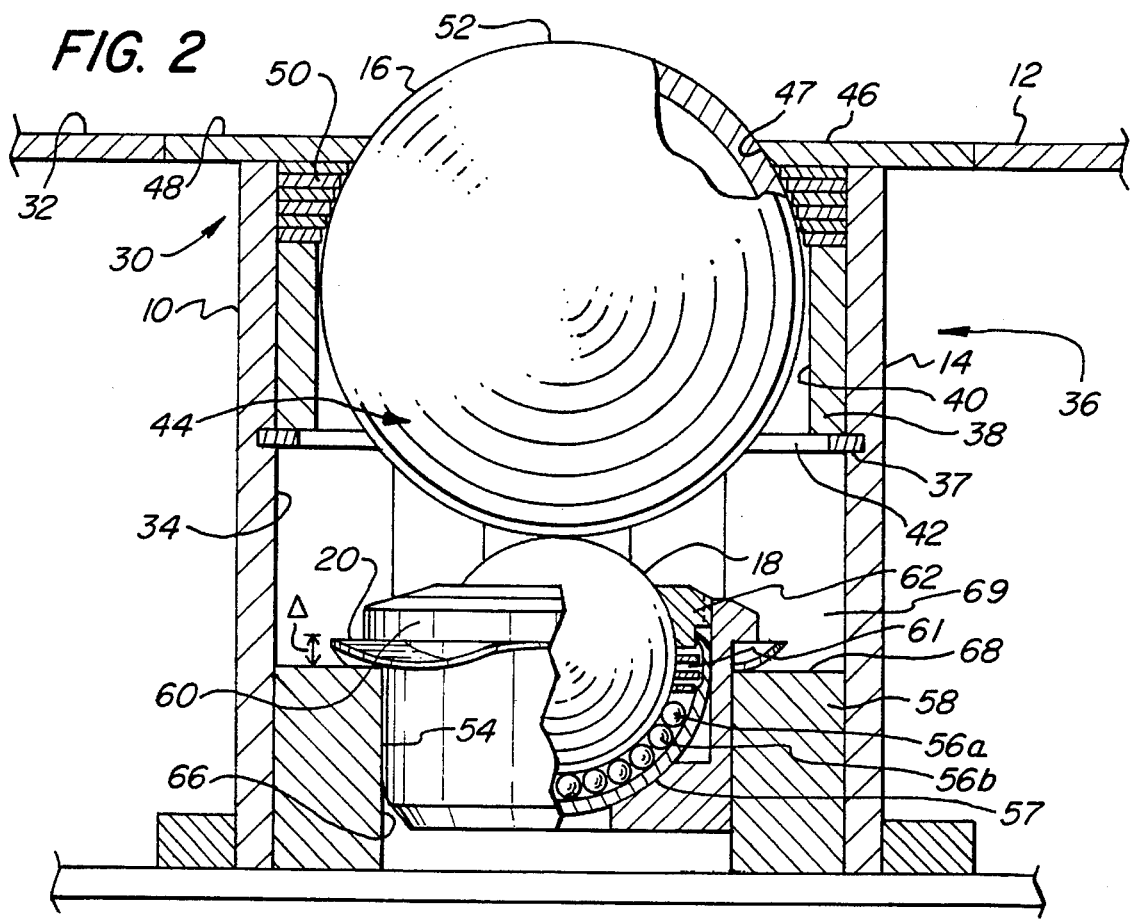
FIG. 2 is a side view, in partial cross section, of a ball transfer unit in accordance with the invention.
Figure 3:
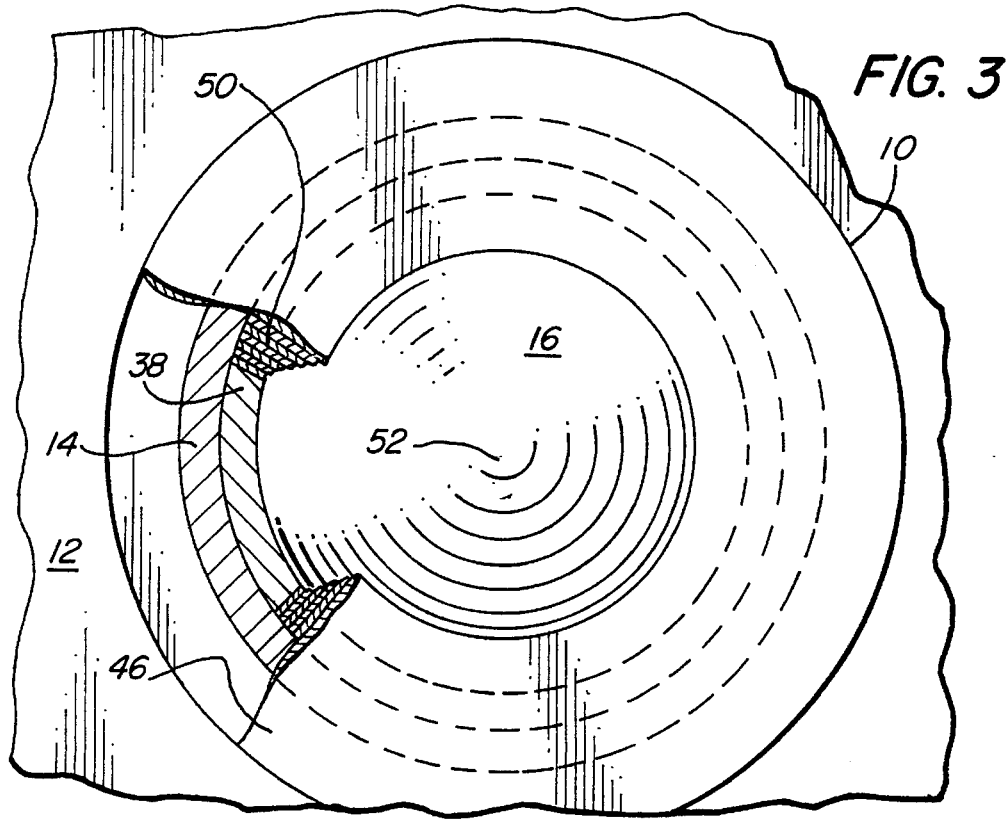
FIG. 3 is a top view of the ball transfer unit shown in FIG. 2, with portions broken away.

Referring to FIGS. 1–5 in detail, a ball transfer unit 10 in accordance with the invention is shown. In the Figures, the same figure numbers are used to identify like elements in the Figure. FIGS. 2 and 3 relate to one embodiment and FIGS. 4 and 5 relate to a second preferred embodiment. To the extent details of these embodiments are distinct, separate numbers are used. As shown in FIG. 1, ball transfer unit 10 is generally inserted into ball deck or field 12 and, as shown respectively in FIGS. 2 and 4, comprises a housing 14, 114 for housing a first ball 16, a second ball 18 which supports first ball 16, and a spring 20, 220 for biasing first and second balls 16 and 18 upward in housing 14, 114.

As shown in FIG. 1, a plurality of ball transfer units 10 are inserted into ball field 12 to move container 22 along a path P. It should be understood that ball field 12 may be inclined (not shown), if desired, to facilitate movement of container 22.

As used herein "container" means any type of container, pallet, or other object or workpiece to be conveyed or moved along ball field 12 in any direction, such as along path P. Typically, containers 22 will be air cargo bins or containers. Containers 22 sometimes have an uneven bottom surface 24, the bottom surface 24 having uppermost portion 26 and lowermost portion 28.

The first housing 14, 114 is preferably circular and made of any suitable material, such as metal, although any material, including plastic materials, may be used which has sufficient structural integrity to withstand the forces exerted by containers 22, conveyed along ball field 12 and workers walking along ball field 12. As shown, for example, in FIG. 2, the first housing has an upper end 30 terminating adjacent upper surface 32 of ball deck 12, and has chamber 34 therein.

Figure 4:
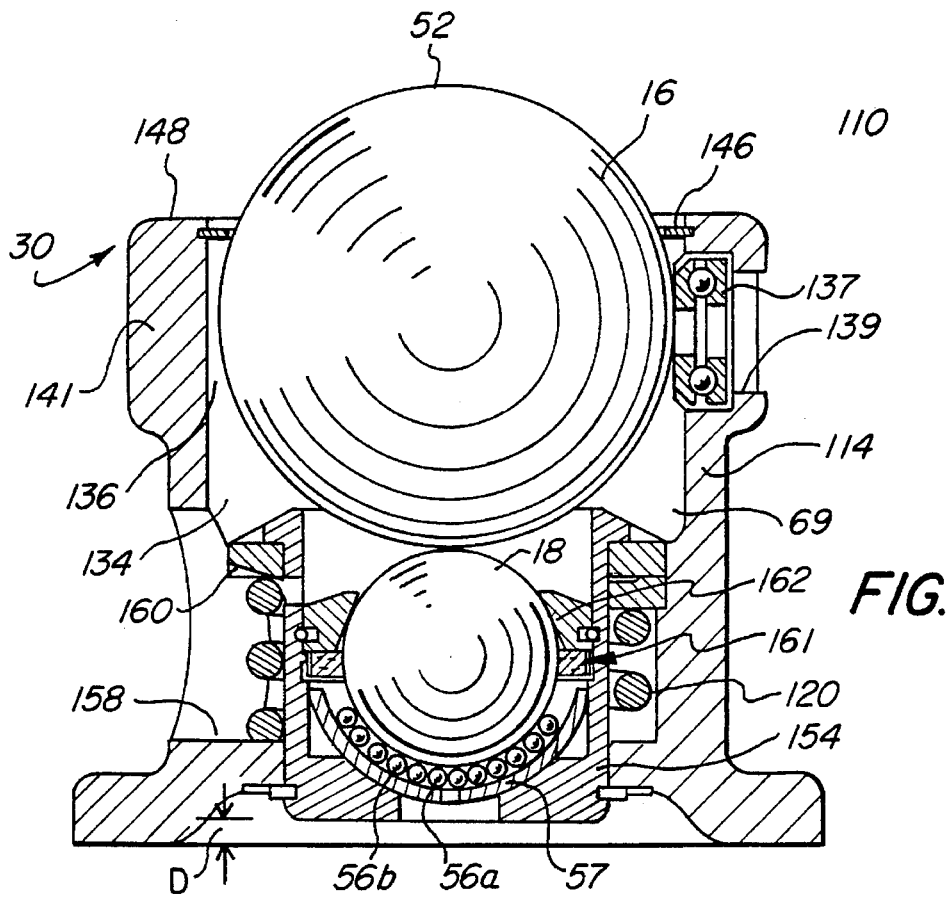
FIG. 4 is a side view, in partial cross-section, of a preferred embodiment of a ball transfer unit in accordance with the invention.

Referring respectively now to FIGS. 2 and 4, first freely rotating load supporting ball 16 is located in upper section or portion 36, 136 of housing chamber 34, 134. First ball 16 has a portion extending above upper surface 32 of ball deck 12, best shown in FIG. 2. First ball 16 can be made of any suitable material, such as very hard plastic, but is most preferably made of metal. First load supporting ball 16 may be solid or hollow, but preferably is hollow, and is most preferably made of two half spheres welded securely together.

Referring now to the embodiment of FIGS. 2 and 3, first housing 14 has a substantially circular frictionless sleeve 38 located in upper portion 36 of chamber 34, as shown in FIGS. 2, 3. Sleeve 38 has inner diameter bore 40 for retaining first ball 16 such that first ball 16 has limited lateral movement. Sleeve 38 may be made of any suitable antifriction material, such as TEFLON®, or any other suitable plastic or other material. Sleeve 38 is supported;by retaining ring 42. Retaining ring 42 is removably fixed in groove 37 in chamber 34, as shown in FIG. 2.

Figure 5:
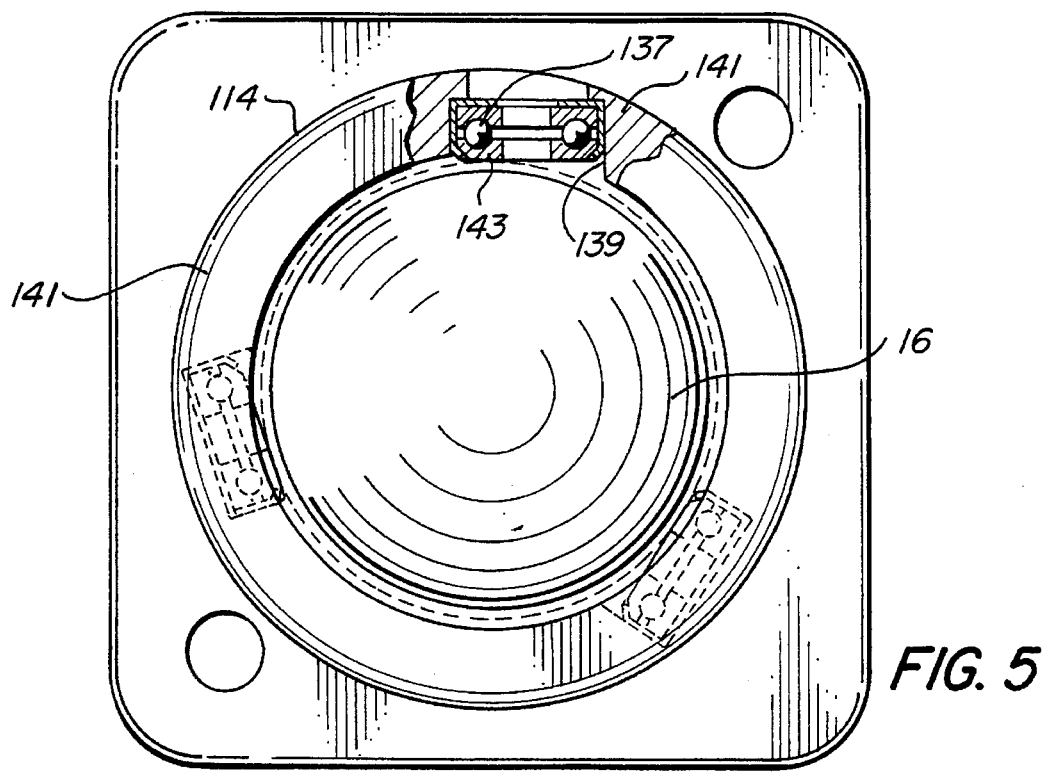
FIG. 5 is a top plan view, with a partial cut-away view, of the ball transfer unit of FIG. 4.

Referring now to the preferred embodiment of FIGS. 3 and 4, first housing 114 has a plurality of bearing elements 137 located around the perimeter of first ball 16. bearing elements 137 reduce frictional drag on rotation of first ball 16 to reduce the pushing force needed to move a container across a ball deck 12. Preferably there are three such bearing elements located about 120 degrees apart around the horizontal plane of ball 16. For ease of construction, bearing elements 137 may comprise small circular bearings placed in circular insets 139 in the upper wall 141 of housing 114. In such case, as seen in FIG. 5, the bearing elements are positioned so that they face slightly off-center from the centerpoint of ball 16, such that only one small portion 143 of the circular bearing is in contact with ball 16. This permits unimpeded frictionless rotation of ball 16 in any direction around a horizontal axis.

As shown in FIGS. 1–5, first housing 14, 114 has retaining member 46, 146 most preferably made of steel and securely fixed to housing 14, 114, for retaining first ball 16 in housing 14, 114. In FIG. 2, upper surface 48 of retaining member 46 is adjacent to upper surface 32 of ball deck 12. In FIG. 4, upper surface 148 of the housing 114 would be adjacent an upper surface of a ball deck 12. Retaining member 46 is generally circular in shape and has a circular opening having a smaller diameter than first ball 16 to prevent escape of ball 16 from housing 14. In FIG. 2, member 46 has angular lip 47, which follows the curvature of first load supporting ball 16; that is, lip 47 has a radius of curvature substantially equal to the radius of curvature of ball 16. It should be understood that any suitable retaining member could be used so long as upward escape of ball 16 is prevented while rotational movement of ball 16 is not interfered with.

It is to be appreciated that any frictional drag caused by the interaction of first ball 16 with retaining member 46, 146 will be eliminated when a load is passed over the ball transfer unit 10, because the load will cause ball 16 to move downwardly away from retaining member 46, 146 so that it can rotate without frictional interference with the retaining member 46, 146. It is possible to increase the frictional drag between first ball 16 and retaining member 46, when the ball 16 is pressed against member 46, by addition of friction materials at the lip 47, if desired to increase safety for workers who might otherwise step on a ball 16 and become unbalanced and fall. However, in the arrangement of FIGS. 2 and 4 the retaining member 46 provides a sufficiently high friction to prevent rotation of ball 16 when a load is not present to prevent possible injury.

Wiper 50, shown in FIGS. 2, 3, extends around upper portion 52 of first ball 16, and, as shown in FIG. 2, is generally located adjacent sleeve 38 and beneath retaining member 46. Wiper 50 has a tapered surface for contacting first ball 16. Wiper 50 will typically comprise multiple layers of any suitable cloth, such as a durable felt.

Referring to FIGS. 2–5, freely rotating second load supporting ball 18 is disposed in second housing 54, 154 and supports first ball 16. Second housing 54, 154, which can be made of any suitable material, preferably plastic, houses a plurality of freely rotating ball bearings, such as ball bearings 56a, 56b, for supporting second ball 18 to provide substantially frictionless rotation thereof. Ball bearings 56a, 56b are housed in ball bearing cup 57, which is most preferably a metal hemispherical or parabolic housing disposed in second housing 54. Housing 154 of FIG. 4 extends above second ball 18 and can provide support for ball 16 in case of a failure of ball bearings 56a.

First ball 16 has a diameter which is larger than, and preferably between about 1.8 to about 4 times larger than the diameter of the second ball 18. Preferably the diameter of first ball 16 is at least twice the diameter of second ball 18. First ball 16 most preferably has a diameter which is about 63.5 millimeters and the second ball 18 most preferably has a diameter of about 30 millimeters. This permits the second ball 18 to be shielded by first ball 16 to prevent contamination of second ball 18.

Spring 20, 120 is located adjacent to second housing 54, 154 and biases second housing 54, 154 upward, as shown respectively in FIGS. 2 and 4. As such, spring 20, 120 biases first and second load supporting balls 16, 18, respectively, to an upward position, and permits balls 16, 18 to be movable to a downward position through a distance D.

The annular spring 20 of FIG. 2 is a Belleville washer, and operates against ring 58 and shoulder 60 of second housing 54, and ring 58 generally acts as a stop means for spring 20. Ring 58 surrounds a chamber 66. Ring 58 can be made of any suitable material, such as metal plastic or other material.

In contrast, the coil spring 120 of FIG. 4 operates against the shoulder 160 of second housing 154 and the base 158 of chamber 134.

Referring respectively to FIGS. 2 and 4, wiper 61, 161 adjacent second ball 18, is similar to wiper 50 adjacent first ball 16. Wiper 61, 161 contacts second ball 18 at a plurality of points and is preferably made of multiple layers of durable felt cloth. Wiper 61, 161 removes dirt and other contaminants from the outer surface of second load supporting ball 18 to reduce the likelihood that contaminants interfere with the rotational movement of ball bearings 56a, 56b.

Retaining member 62, 162 adjacent second ball 18, operates similarly to retaining member 46. Retaining member 62 operates to prevent undesired escape of second ball 18 from second housing 54.

In use, first ball 16 of ball transfer unit 10, when not operated upon by outside forces, is naturally biased to an upward position as shown in FIGS. 2 and 4, respectively, by springs 20, 120. As such, the upper surface of first ball 16 is maximally displaced above upper surface 32 of ball deck 12.

In operation, container 22 is placed on ball field 12 and is generally pushed by worker 64 along path P, as depicted in FIG. 1. As container 22 moves across individual ball transfer units 10, lower portion 28 of bottom surface 24 of container 22 contacts upper portion 52 of first load supporting ball 16, causing first load supporting ball 16 to rotate. Downward force from container 22 causes first load supporting ball 16 to move downwardly from an up position (shown in FIG. 2) to a down position. First and second load supporting balls 16, 18 are maintained in downward positions so long as a sufficient force is exerted downward onto first load supporting ball 16 to overcome the biasing of spring 20, 120.

As first load supporting ball 16 rotates due to movement of container 22, second load supporting ball 18 and ball bearings 56a, 56b also rotate. As first load supporting ball 16 rotates, wiper 50 brushes against outer surface of first ball 16 and wiper 61, 161 brushes against outer surface of second ball 18, wiping off dirt and other contaminants. While wiper 50 reduces the amount of the contaminants which may fall toward second load supporting ball 18, first ball 16 shields second ball 18 from contaminants by virtue of its larger size. As such, contaminants which fall downwardly do not contact second ball 18 or ball bearings 56a, 56b. Contaminants generally accumulate in annular channel 69, defined in FIG. 2 by the surface 68 of ring 58, the inner wall of housing 14, and the shoulder 60 of second housing 54, and in FIG. 4 by the housing 114 and upper end of second housing 154. Thus failure of ball transfer unit 10 due to excessive contamination in ball bearings 56a, 56b, is reduced or eliminated because contaminants can collect in a channel away from the ball bearings.

After lowermost portion 28 of bottom surface 24 of container 22 moves across ball transfer unit 10, uppermost portion 26 of bottom surface 24 passes across unit 10. Spring 20, 120 biases second housing 54, 154 upward, moving first ball 16 from a down position to an up position, until first ball 16 contacts surface 26 of container 22 or until housing 54 is maximally displaced a distance D.

Applicant's comparative data reveals that a ball transfer unit which does not use a spring requires substantially more force to convey container 22 having an uneven bottom surface, than does a ball transfer unit 10 which has spring 20 capable of biasing first load supporting ball 16 upward. For example, the ball transfer unit of FIGS. 2 and 3, where spring 20 is omitted, requires 585 pounds of force to move a 10,000 pound container. However, with spring 20 included in the ball transfer unit of FIGS. 2–3, only 400 pounds of force are needed to move the same 10,000 pound container.

Although the operation of only one ball transfer unit 10 was described in operation of movement of container 22, it should be understood that multiple such units 10 will be used in a ball deck to contact and support container 22.

Although the invention was described as operating in a particular direction along path P, it should be understood that the invention is equally operable for conveying container 22 in any direction.

The ball transfer unit 10 of the invention may be manufactured for installation in as new ball deck 12, or it may be retrofitted into an existing ball deck 12.

An advantage of the invention is that first supporting balls 16 are used that are larger than the roller balls in prior art BTUs, so each such ball 16 provides a larger surface area to support container 22. Therefore fewer ball transfer units 10 are needed for a given area of ball deck 12. And because a larger ball 16 with a larger supporting area reduces the point contact stress on container 22, less durable containers can be used. For example, containers can be made of thinner, lighter weight materials. Light weight containers 22, particularly when used in connection with air cargo, provide substantial fuel economy and cost savings because of the reduced excess weight that must be carried into the sky with each flight. The use of lighter containers 22 also reduces the amount of human energy necessary to convey the containers. Thus, the use of ball transfer units 10 provide substantial opportunities to increase efficiency and economy in baggage handling.

It should be understood by those skilled in the art that obvious modifications can be made without departing from the spirit of the invention. Accordingly, reference should be made primarily to the accompanying claims, rather than the foregoing specification, to determine the scope of the invention.

We claim:

1. A ball deck having an upper surface, comprising: at least one ball transfer unit, each ball transfer unit having:

a first housing, the first housing having an upper end terminating adjacent the upper surface of the ball deck, and having a chamber therein;

a first load supporting ball rotably located in an upper section of the housing chamber, the first ball having a portion extending above the upper surface of the ball deck;

a second load supporting ball, the second ball having a lesser diameter than the first ball, the second ball being located below the first ball and providing a sole support for the first ball;

means for supporting the second ball, the supporting means having means for substantially frictionless rotation of the second ball;

a channel for collecting contaminants surrounding the means for supporting the second ball, whereby the contaminants are collected and prevented from contaminating the second ball;

a substantially frictionless means located in the upper section of the chamber for retaining the first ball; and means for retaining the first ball in the housing.

2. A ball deck in accordance with claim 1, further comprising a spring for axially biasing the first ball upwardly, whereby the first ball is movable between an up position and a down position.

3. A ball deck in accordance with claim 1, wherein the first ball has a diameter which is between about 1.8 to about 4 times larger than the diameter of the second ball.

4. A ball deck in accordance with claim 2, further comprising a spring for axially upwardly biasing the means for supporting the second ball, whereby the second ball and the first ball are both axially upwardly biased and are both movable between an up position and a down position.

5. A ball deck in accordance with claim 1, wherein the first ball is hollow.

6. A ball deck for conveying containers having a bottom surface, comprising:

a ball deck having an upper surface; and a plurality of ball transfer units, each ball transfer unit having:

a first housing disposed below the ball deck upper surface and having an upper portion adjacent to the ball deck upper surface;

a first ball rotably disposed in the first housing, the first ball having a portion which projects above the ball deck upper surface, wherein the first ball is movable between an upward and a downward position;

a second housing disposed inside the first housing, the second housing being movable between an upward and a downward position;

a second ball rotably disposed inside the second housing, the second ball providing a sole support for the first ball, the diameter of the first ball being larger than the diameter of the second ball;

a spring for biasing the second housing towards the upward position, causing the first ball to be biased upwards, said spring being compressed when a load is applied to said first ball whereby said ball transfer unit will accommodate an irregular bottom surface of a container conveyed across the ball deck; and a channel surrounding the second housing for collecting contaminants, whereby the contaminants are collected and prevented from contaminating the second ball.

7. A ball deck in accordance with claims 6, wherein said first housing is provided with substantially frictionless means for laterally retaining said first ball.

8. A ball deck in accordance with claim 7, wherein said second housing is provided with substantially frictionless means for rotation of said second ball.

9. A ball deck in accordance with claim 8, wherein the diameter is at least twice the diameter of the second ball.

10. A ball deck in accordance with claims 9, wherein the first ball is hollow.

11. A ball transfer unit for insertion into a ball deck, comprising:

a first housing, the first housing having an upper end and having a chamber therein;

a first load supporting ball rotably located in an upper section of the housing chamber, the first ball having a portion extending above the upper end of the first housing;

a second load supporting ball, the second ball having a lesser diameter than a diameter of the first ball, the second ball providing a sole support for the first ball;

means for supporting the second ball having means for substantially frictionless rotation of the second ball;

means for substantially frictionless retaining of said first ball to minimize lateral movement of said first ball; and means for retaining the first ball in the first housing;

a spring for axially upwardly biasing the means for supporting the second ball, whereby the second ball and the first ball are both axially upwardly biased and are movable between an up position and a down position; and a channel surrounding the means for supporting the second ball for collecting contaminants, whereby the contaminants are collected and prevented from contaminating the second ball.

12. A ball transfer unit in accordance with claim 11, wherein said means for substantially frictionless retaining of said first ball to minimize lateral movement of said first ball comprises a plurality of bearing elements spaced apart in an inner wall of said housing around a horizontal perimeter of said first ball.

13. A ball transfer unit for insertion into a ball deck, comprising:

a first housing, the first housing having an upper end and having a chamber therein;

inner walls of said first housing having bearing elements permitting multidirectional substantially frictionless rotation of a first load supporting ball located in an upper section of the housing chamber, the first ball having a portion extending above the upper end of the first housing;

a second housing located in said chamber below said first ball and containing a second, load supporting ball, the second ball having a lesser diameter than a diameter of the first ball, the second ball supporting the first ball, the second housing being provided with means for substantially frictionless rotation of said second ball;

means for retaining the first ball in the first housing;

means for retaining the second ball in the first housing;

a spring for axially biasing the second housing upwardly, whereby the first ball and second ball is are movable between an up position and a down position, said spring being compressed when a load is applied to said first ball whereby said ball transfer unit will accommodate an irregular bottom surface of a container conveyed on said ball transfer unit; and a channel surrounding the means for supporting the second ball for collecting contaminants.

14. A ball transfer unit in accordance with claim 13, wherein said first ball has a diameter which is between 1.8 to 4.0 times larger than the diameter of said second ball.

15. A ball transfer unit in accordance with claim 14, wherein said first ball has a contact area for supporting a container which is of a sufficient size to minimize load on said container.

16. A ball transfer unit in accordance with claim 15, wherein the first ball is hollow.

* * * * *